United States Patent
Huang et al.

(10) Patent No.: US 11,924,737 B2
(45) Date of Patent: Mar. 5, 2024

(54) METHOD FOR PERFORMING RELAY FORWARDING ON INTEGRATED ACCESS AND BACKHAUL LINKS, INFORMATION ACQUISITION METHOD, NODE, AND STORAGE MEDIUM

(71) Applicant: ZTE CORPORATION, Guangdong (CN)

(72) Inventors: Ying Huang, Shenzhen (CN); Lin Chen, Shenzhen (CN)

(73) Assignee: ZTE CORPORATION, Shenzhen (CN)

(*) Notice: Subject to any disclaimer, the term of this patent is extended or adjusted under 35 U.S.C. 154(b) by 0 days.

(21) Appl. No.: 18/175,271

(22) Filed: Feb. 27, 2023

(65) Prior Publication Data

US 2023/0224796 A1     Jul. 13, 2023

Related U.S. Application Data

(63) Continuation of application No. 17/044,017, filed as application No. PCT/CN2019/081545 on Apr. 4, 2019, now Pat. No. 11,595,875.

(30) Foreign Application Priority Data

Apr. 5, 2018  (CN) ........................ 201810302723.5

(51) Int. Cl.
*H04W 40/22*     (2009.01)
*H04W 8/08*      (2009.01)
*H04W 92/20*     (2009.01)

(52) U.S. Cl.
CPC ............ *H04W 40/22* (2013.01); *H04W 8/08* (2013.01); *H04W 92/20* (2013.01)

(58) Field of Classification Search
None
See application file for complete search history.

(56) References Cited

U.S. PATENT DOCUMENTS

| | | | |
|---|---|---|---|
| 10,432,295 B2* | 10/2019 | Majmundar | H04L 45/123 |
| 2012/0020278 A1 | 1/2012 | Moberg et al. | |
| 2019/0159277 A1 | 5/2019 | Zhu et al. | |
| 2019/0182140 A1* | 6/2019 | Tenny | H04W 48/20 |
| 2019/0223078 A1* | 7/2019 | Sirotkin | H04L 45/34 |

FOREIGN PATENT DOCUMENTS

| | | |
|---|---|---|
| CN | 101998679 A | 3/2011 |
| CN | 106559798 A | 4/2017 |
| WO | WO-2011/023101 A1 | 3/2011 |

OTHER PUBLICATIONS

Extended European Search Report for EP Appl. No. 19780942.9, dated Dec. 8, 2021 (16 pages).

(Continued)

*Primary Examiner* — Brian S Roberts
(74) *Attorney, Agent, or Firm* — Foley & Lardner LLP

(57) ABSTRACT

Provided is a method for performing relay forwarding on integrated access and backhaul (IAB) links. The method includes receiving, by a first IAB node, a data packet; and transmitting, by the first IAB node, the data packet to an IAB donor. Further provided are an information acquisition method, an IAB node, an IAB donor node and a storage medium.

14 Claims, 4 Drawing Sheets

(56) References Cited

OTHER PUBLICATIONS

First Office Action for CN Appl. No. 201810302723.5, dated Feb. 26, 2021 (with English translation, 50 pages).
HUAWEI: "Adaptation layer based L2 relaying and light L2 relaying" 3GPP TSG-RAN WG3 #99; R3-180814; Mar. 2, 2018; Athens, Greece (5 pages).
HUAWEI: "Overview on Support of IAB" 3GPP TSG-RAN WG3#99; R3-180815; Mar. 2, 2018; Athens, Greece (5 pages).
Intel Corporation: "On RAN architecture for IAB relaying in NR" 3GPP TSG-RAN3 Meeting #99; R3-181351; Mar. 2, 2018; Athens, Greece (6 pages).
International Search Report for Application No. PCT/CN2019/081545, dated Jun. 28, 2019, 2 pages.
Nokia et al.: "Architecture and Protocols: MAC adaptation layer based IAB" 3GPP TSG-RAN WG3#99; R3-180993; Mar. 2, 2018; Athens, Greece (6 pages).
Second Office Action for CN Appl. No. 201810302723.5, dated Nov. 26, 2021.

* cited by examiner

METHOD FOR PERFORMING RELAY FORWARDING ON INTEGRATED ACCESS AND BACKHAUL LINKS, INFORMATION ACQUISITION METHOD, NODE, AND STORAGE MEDIUM

CROSS REFERENCE TO RELATED APPLICATIONS

This application claims benefit of priority under 35 U.S.C. § 120 as a continuation of U.S. application Ser. No. 17/044,017, filed Sep. 30, 2020, which claims priority to International Patent Application No. PCT/CN2019/081545, filed Apr. 4, 2019, which claims priority to Chinese patent application No. 201810302723.5 filed with the CNIPA on Apr. 5, 2018, disclosures of which are incorporated herein by reference in their entireties.

TECHNICAL FIELD

The present disclosure relates to a field of communications, for example, to a method for performing relay forwarding on integrated access and backhaul links, an information acquisition method, a node, and a storage medium.

BACKGROUND

Usage of a larger available bandwidth, massive Multiple-Input Multiple-Output (MIMO) and multi-beam of 5th-Generation (5G) New Radio (NR) compared to Long Term Evolution (LTE) makes the research and application of integrated access and backhaul (IAB) links possible. Through radio backhaul links and relay links, dense NR cell networks can be deployed more flexibly without increasing transmission network dense deployment accordingly.

In an example of deploying an IAB network, nodes A, B and C are all access nodes, a user equipment may connect to the access nodes A, B and C through access links, but only a wired connection between the access node A and a core network element exists, and there is no wired connection between the access nodes B/C and the core network element. An access node that supports the radio access of the UE and performs radio backhaul on data is called an IAB node. An access node that provides a radio backhaul function for the IAB node to connect the UE to the core network is called as an IAB donor. Data of the UE may be transmitted among the access nodes through the radio backhaul links. For example, the access node B may transmit the data received from the UE to the access node A through the radio backhaul links, and then the access node A transmits the data received from the UE to the core network element. For the downlink, the core network element may transmit a UE data packet to the access node A, and then the access node A transmits the UE data to the access node B through the radio backhaul links, and then the access node B transmits the UE data to the UE through the access links. The access links and backhaul links may use same or different carrier frequencies.

How to perform relay forwarding in the IAB architecture so as to correctly transmit and receive the UE's data is the problem to be solved.

SUMMARY

Embodiments of the present disclosure provide a method for performing relay forwarding on integrated access and backhaul links, an information acquisition method, a node, and a storage medium to at least solve a problem of how to relay forwarding in the IAB architecture so as to correctly transmit and receive a user equipment (UE)'s data.

The embodiment of the present disclosure provides a method for performing relay forwarding on integrated access and backhaul (IAB) links, including steps described below.

A first IAB node receives a data packet.

The first IAB node transmits the data packet to an IAB donor.

The embodiment of the present disclosure further provides a method for performing relay forwarding on integrated access and backhaul (IAB) links, including steps described below.

An IAB donor distribution unit (DU) receives a data packet transmitted by an IAB node.

The IAB donor DU obtains first information, where the first information includes at least one of: a source node identifier, a target node identifier, a UE identifier to which the data packet belongs, and a bearer identifier to which the data packet belongs, a channel identifier to which the data packet belongs, routing path information, Quality of Service (QoS) related information, general packet radio service tunneling protocol (GTP) tunnel information, control plane indication information, user plane indication information or protocol type indication information.

The IAB donor DU transmits the data packet to an IAB donor centralization unit (CU) according to the first information.

The IAB donor DU is the IAB node, or a DU node in an IAB donor, or a DU node wiredly connected to a CU in the IAB donor.

The embodiment of the present disclosure further provides a method for performing relay forwarding on integrated access and backhaul (IAB) links, including steps described below.

An IAB donor receives a data packet from a core network element or an application layer.

The IAB donor transmits the data packet to an IAB node to directly or indirectly transmit the data packet to a UE through the IAB node.

The embodiment of the present disclosure further provides a method for performing relay forwarding on integrated access and backhaul (IAB) links, including steps described below.

An IAB node receives a data packet from an IAB donor.

The IAB node transmits the data packet to a user equipment (UE).

The embodiment of the present disclosure further provides an information acquisition method, including steps described below.

An integrated access and backhaul (IAB) links node acquires first mapping related information; where the first mapping related information includes at least one of:

a mapping relationship between QoS class identifier (QCI) and differentiated services code point (DSCP); a mapping relationship between a 5th-generation QoS identifier (5QI) and type of service (TOS); a mapping relationship between the QCI and the TOS; a mapping relationship between the 5QI and the QCI; a mapping relationship between the QCI and the QCI;

a mapping relationship between the 5QI and the 5QI; a mapping relationship between a quality of service flow identifier (QFI) and the QFI; a mapping relationship between a bearer identifier and the QFI; or a mapping relationship between the bearer identifier and the bearer identifier.

The embodiment of the present disclosure further provides an information acquisition method, including steps described below.

An integrated access and backhaul (IAB) links donor distribution unit (DU) acquires mapping related information; where the mapping related information includes at least one of:

a mapping relationship between user equipment (UE) bearer information and general packet radio service tunneling protocol (GTP) tunnel information of an F1 interface; a mapping relationship between the GTP tunnel information of the F1 interface, a target node identifier and UE bearer information; a mapping relationship between the GTP tunnel information of the F1 interface and the target node identifier; or a mapping relationship between the GTP tunnel information of the F1 interface.

The UE bearer information includes at least one of: a UE identifier or a bearer identifier;

The GTP tunnel information of the F1 interface includes at least one of: an address or tunnel endpoint identifier (TEID) information;

The IAB donor DU is one of: the IAB node, a DU node in an IAB donor, and a DU node wiredly connected to a CU in the IAB donor.

The embodiment of the present disclosure further provides an integrated access and backhaul (IAB) links node in an IAB donor, including a memory, a processor, and a computer program stored in the memory and executable on the processor, where when executing the computer program, the processor implements the method applied to the IAB node in any embodiment described above.

The embodiment of the present disclosure further provides an integrated access and backhaul (IAB) links donor node in IAB, including a memory, a processor, and a computer program stored in the memory and executable on the processor, where when executing the computer program, the processor implements the method applied to the IAB donor node in any embodiment described above.

The embodiment of the present disclosure further provides a computer-readable storage medium configured to store computer-executable instructions for executing the method in any embodiment when executed by a processor.

Solutions of the above embodiment may perform relay forwarding in the IAB architecture so as to correctly transmit and receive the UE's data.

DETAILED DESCRIPTION

Objects, technical solutions and advantages of the present disclosure will be clearer from a detailed description of embodiments of the present disclosure in conjunction with the drawings. It is to be noted that if not in collision, the embodiments and features therein in the present application may be combined with each other.

Figure 1A:
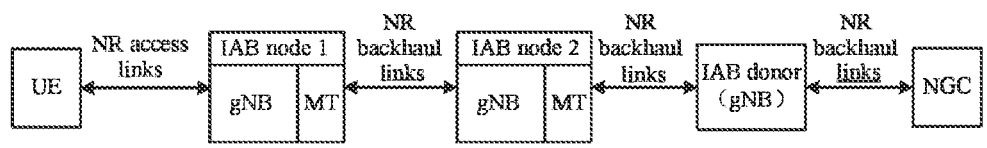
FIG. 1A is a schematic diagram of an TAB deployment scenario where a centralization unit (CU) is not separated from a distribution unit (DU).

Data of a user equipment (UE) may need to be transmitted through multi-hop relay backhaul links between an access node and a core network, as shown in FIG. 1A. An uplink data packet of the UE may be sent to an IAB donor through two IAB nodes, and then sent to a Next Generation Core (NGC). In this case, an IAB node 1 to which the UE is directly connected is called a serving IAB node, and an IAB node 2 may be called an intermediate IAB node. In FIG. 1A, the data of the UE needs to be transmitted to the core network through the IAB node 1, the IAB node 2 and the IAB donor sequentially.

Figure 1B:
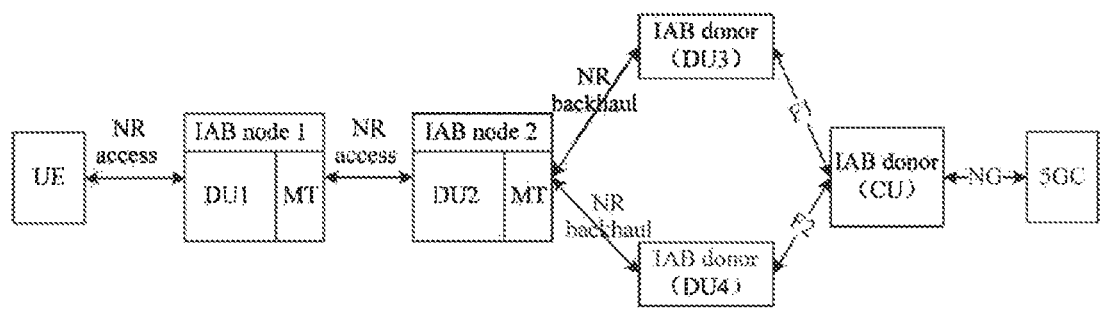
FIG. 1B is a schematic diagram of an IAB deployment scenario where the centralization unit (CU) is separated from the distribution unit (DU).

In addition, it is an important technical feature in the New Radio (NR) to support a centralized unit (CU)/distributed unit (DU) separated deployment. When the CU/DU is separated, an IAB architecture is as shown in FIG. 1B, the IAB node 1 and the IAB node 2 each have a distribution unit (DU) and a mobile terminal (MT) (which may also be called as UE) functions, and the IAB donor has a DU and a CU function.

The following are the embodiments of the present disclosure. It should be noted that the following multiple embodiment methods are applicable to scenarios where the CU/DU is deployed separately or not. The UE may be a NR UE or an LTE UE. The UE may be accessed in a standalone (SA) mode or a non-standalone (NSA) mode. The UE may be accessed in a dual connection mode or a single connection mode. The IAB node may access to a network in the standalone (SA) mode or the non-standalone (NSA) mode. The IAB node may access to the network in the dual connection mode or the single connection mode. An adaptor layer may be located above a radio link control (RLC) layer, or between the RLC layer and the media access control (MAC) layer, or an adaptor layer function is located in the RLC or MAC layer.

In an embodiment, a method for performing relay forwarding on integrated access and backhaul (IAB) links is provided, the method is applied in an uplink direction and on an IAB node side. The method includes steps described below.

In step one, a first IAB node receives a data packet.

In step two, the first IAB node transmits the data packet to an IAB donor.

Optionally, the step in which the first IAB node transmits the data packet to the IAB donor includes a step described below. The first IAB node obtains routing related information, and transmits the data packet to the IAB donor according to the routing related information.

Optionally, the step in which the first IAB node receives the data packet includes steps described below.

The first IAB node receives the data packet from a user equipment (UE); or

The first IAB node receives the data packet from an application layer of the first IAB node itself.

The first IAB node receives the data packet from another IAB node, where the data packet is user-plane data or control-plane signaling.

Optionally, the step in which the first IAB node transmits the data packet to the IAB donor includes steps described below.

The first IAB node transmits the data packet to the IAB donor directly; or, the first IAB node forwards the data packet to another IAB node, and transmits the data packet to the IAB donor through the another IAB node directly or indirectly.

Optionally, the routing related information includes at least one of: a source node identifier;

a source node address; a target node identifier; a target node address; routing path information;

a bearer type; a bearer identifier; a master base station or a master node identifier; a master base station or a master node address; a secondary base station or a secondary node identifier; a secondary base station or a secondary node identifier; routing path information about routing to a master node or to the master base station; routing path information about routing to a secondary node or to the secondary base station; a next-hop node ID; a next-hop address; or general packet radio service tunneling protocol (GTP) tunnel information.

The UE identifier is one of: a 5G base station centralized unit user equipment F1 interface access point identifier (gNB-CU UE F1AP ID), a gNB-DU UE F1AP ID, a cell radio network temporary identifier (C-RNTI), an S1 interface access point identifier (S1 AP ID), an X2 AP ID, an NG AP ID and an Xn AP ID.

The bearer identifier is one of: a data radio bearer identifier (DRB ID), a signaling radio bearer identifier (SRB ID), a logical channel identifier (LCD), a quality of service flow identifier (QFI), and a flow identifier.

The target node identifier is one of: a DU identifier, a CU identifier, a base station identifier, a user plane function (UPF) identifier, an access and mobility management function (AMF) identifier, a cell identifier and a target index number.

Optionally, the step in which the first IAB node obtains routing related information includes one or more manners described below.

The first IAB node obtains the routing related information from an access side network element through radio resource control (RRC) signaling, F1 signaling, X2 signaling, Xn signaling or other interface information.

The first IAB node obtains the routing related information from a core network element through S1 signaling, NG signaling, or other interface information.

The first IAB node obtains the routing related information from an application server.

The first IAB node obtains the routing related information from an adaptor layer header of the received data packet.

The first IAB node obtains the routing related information from an Internet protocol (IP) layer header of the received data packet.

Optionally, the routing related information obtained by the first IAB node is configured at a granularity of a UE; or the routing related information is configured at a granularity of a UE's bearer, where the first IAB node obtains a bearer identifier and routing related information corresponding to the bearer identifier; or the routing related information is configured at a granularity of a UE's bearer type, where the first IAB node obtains a bearer type and routing related information corresponding to the bearer type.

Optionally, the step in which the first IAB node transmits the data packet to the IAB donor includes a step described below.

The IAB donor adds an adaptor layer header to the data packet, where the adaptor layer header includes at least one of: a source node identifier, a target node identifier, a UE identifier to which the data packet belongs, and a bearer identifier to which the data packet belongs, a channel identifier to which the data packet belongs, routing path information, Quality of Service (QoS) related information, general packet radio service tunneling protocol (GTP) tunnel information, control plane indication information, user plane indication information or protocol type indication information.

The protocol type indication information may include one of: an F1, an F1 control plane, an F1 user plane, an IP, a non-IP, a stream control transmission protocol (SCTP), an NG, an S1, an Xn and an X2.

Optionally, the adding an adaptor layer header is performed by an adaptor layer located above a radio link control (RLC) layer; or an adaptor layer located between the RLC layer and a media access control (MAC) layer; or an adaptor layer functional entity located at the RLC layer; or an adaptor layer functional entity located at the MAC layer.

Optionally, the step in which the first IAB node transmits the data packet to the IAB donor includes: transmitting the data packet to a next-hop node in modes described below.

The first IAB node maps, according to a mapping rule and at least one of a bearer to which the data packet belongs or Quality of Service (QoS) related information of a QoS flow, the data packet to a corresponding radio bearer to transmit to the next-hop node, where the mapping rule includes at least one of: a packet mapping rule, a QoS rule, a mapping rule between the QoS related information and differentiated services code point (DSCP), and a mapping rule between the QoS related information and type of service (TOS).

The first IAB node maps, according to the corresponding mapping rule and based on one of a logical channel or radio bearer of a UE to which the data packet belongs, or a logical channel or radio bearer of a previous-hop IAB node related to the data packet, the data packet to a radio bearer or logical channel of the first IAB node to transmit to the next-hop node.

Optionally, the step in which the first IAB node transmits the data packet to the IAB donor includes steps described below.

The first IAB node maps, according to a radio bearer to which the data packet belongs and a mapping relationship between the radio bearer and a general packet radio service tunneling protocol (GTP) tunnel of an F1 interface, the data packet to the GTP tunnel of the F1 interface corresponding to the radio bearer to which the data packet belongs.

The first IAB node adds an adaptor layer header to the data packet, where the adaptor layer header includes at least one of: a source node identifier, a target node identifier, a user equipment (UE) identifier to which the data packet belongs, routing path information, Quality of Service (QoS) related information, GTP tunnel information, control plane indication information, user plane indication information, or protocol type indication information.

Optionally, after the first IAB node maps the data packet to the corresponding GTP tunnel of the F1 interface, the method further includes steps described below.

The first IAB node maps the data packet added with the adaptor layer header to the logical channel or radio bearer, and transmits the data packet to a next-hop node; or, the first IAB node takes the data packet encapsulated by an F1 user plane interface (F1-U) as a data packet of the first IAB node itself that serves as a UE, maps an F1-U GTP bearer of the UE to which the encapsulated data packet belongs to the logical channel, radio bearer or QoS flow of the first IAB node, and transmits the encapsulated data packet through a protocol data unit (PDU) session of the first IAB node itself.

Optionally, after the first IAB node obtains the routing related information, the method further includes steps described below.

The first IAB node determines a target node and the next-hop node of the data packet or a routing path according to the routing related information.

The target node is the IAB donor, or the gNB-CU in the IAB donor, or the gNB-DU in the IAB donor, or the gNB-DU connected to the gNB-CU in the IAB donor, or the UPF, or the AMF, or the base station, or the IAB node.

The next-hop node is the IAB donor or the IAB node.

Optionally, the step in which the first IAB node obtains the routing relation information includes a step described below.

The first IAB node obtains the routing related information from an adaptor layer header of the received data packet.

After the first IAB node obtains the routing related information, the method further includes at least one of steps described below. The first IAB node searches, according to the routing related information, a routing table to determine the next-hop node, where the next-hop node is the IAB donor or the IAB node; or adds an adaptor layer header.

The target node is the IAB donor, or the gNB-CU in the IAB donor, or the gNB-DU in the IAB donor, or the gNB-DU connected to the gNB-CU in the IAB donor, or the UPF, or the AMF, or the base station, or the IAB node.

The next-hop node is the IAB donor or the IAB node.

The embodiment of the present disclosure further provides a method for performing relay forwarding on integrated access and backhaul (IAB) links, the method is applied in an uplink direction and on an IAB donor side. The method includes steps described below.

In step A, an IAB donor distribution unit (DU) receives a data packet transmitted by an IAB node.

In step B, the IAB donor DU obtains first information, where the first information includes at least one of: a source node identifier, a target node identifier, a UE identifier to which the data packet belongs, and a bearer identifier to which the data packet belongs, a channel identifier to which the data packet belongs, routing path information, Quality of Service (QoS) related information, general packet radio service tunneling protocol (GTP) tunnel information, control plane indication information, user plane indication information or protocol type indication information.

In step C, the IAB donor DU transmits the data packet to an IAB donor centralization unit (CU) according to the first information.

The IAB donor DU is the IAB node, a DU node in an IAB donor, or a DU node wiredly connected to a CU in the IAB donor.

Optionally, the step in which the IAB donor DU obtains the first information includes a step described below.

The IAB donor DU obtains at least part of the first information from an adaptor layer header of the data packet.

Optionally, the step in which the IAB donor DU transmits the data packet to the IAB donor centralization unit (CU) according to the first information includes steps described below.

The IAB donor DU maps the data packet to a corresponding GTP tunnel of an F1 interface according to the first information, and transmits the data packet to the IAB donor CU.

After adding an adaptor layer header to the data packet, the IAB donor DU transmits the data packet to the IAB donor CU through the GTP tunnel of the F1 interface.

The adaptor layer header includes at least one of: the source node identifier, the target node identifier, the UE identifier to which the data packet belongs, and the bearer identifier to which the data packet belongs, the channel identifier to which the data packet belongs, the routing path information, the QoS related information, the GTP tunnel information, the control plane indication information, the user plane indication information or the protocol type indication information.

Optionally, the adding an adaptor layer header is performed by an adaptor layer located above a radio link control (RLC) layer; or an adaptor layer located between the RLC layer and a media access control (MAC) layer; or an adaptor layer functional entity located at the RLC layer; or an adaptor layer functional entity located at the MAC layer.

Optionally, the step in which the IAB donor DU maps the data packet to the corresponding GTP tunnel of the F1 interface and transmits the data packet to the IAB donor centralization unit (CU) according to the first information includes steps described below.

The IAB donor DU determines the GTP tunnel of the F1 interface corresponding to a UE and a bearer to which the data packet belongs, maps the data packet to the GTP tunnel of the F1 interface and transmits the data packet to the IAB donor CU according to a corresponding mapping rule, so that the IAB donor CU identifies the UE and the bearer to which the data packet belongs according to tunnel information in a GTP-U packet header.

In response to acquiring the GTP tunnel information from the data packet and performing processing and encapsulation in a GTP-U protocol layer, the IAB donor DU transmits the GTP tunnel information included in the GTP-U packet header to the IAB donor CU, so that the IAB donor CU identifies the UE and the bearer to which the data packet belongs according to the GTP tunnel information in the GTP-U packet header; or, in response to acquiring the GTP tunnel information from the data packet and performing processing and encapsulation in the GTP-U protocol layer, the IAB donor DU transmits GTP tunnel information which is between the IAB donor CU and the IAB donor DU corresponding to the GTP tunnel information and included in the GTP-U packet header to the IAB donor CU, so that the IAB donor CU identifies the UE and the bearer to which the data packet belongs according to the GTP tunnel information in the GTP-U packet header.

Optionally, in response to the adaptor layer header added by the IAB donor DU to the data packet does not include the UE identifier to which the data packet belongs and the bearer identifier to which the data packet belongs, the method further includes steps described below.

The IAB host DU determines, based on a correspondence relationship among the bearer, the UE and a GTP-U tunnel established by a GTP-U above the adaptor layer, the UE and the bearer to which the data packet belongs according to the GTP-U tunnel to which the data packet belongs.

The embodiment of the present disclosure further provides a method for performing relay forwarding on integrated access and backhaul (IAB) links, the method is applied in a downlink direction and on an IAB donor side. The method includes steps described below.

In step a, an IAB donor receives a data packet from a core network element or an adaptor layer.

In step b, the IAB donor sends the data packet to the IAB node to directly or indirectly transmit the data packet to the UE through the IAB node.

Optionally, the step in which the IAB donor transmits the data packet to a second IAB node includes a step described below.

The IAB donor adds an adaptor layer header to the data packet after the IAB donor parses the data packet in a corresponding protocol layer, where the adaptor layer header carries at least one of: a source node identifier, a target node identifier, a UE identifier to which the data packet belongs, and a bearer identifier to which the data packet belongs, a channel identifier to which the data packet belongs, routing path information, Quality of Service (QoS) related information, general packet radio service tunneling protocol (GTP) tunnel information, control plane indication information, user plane indication information or protocol type indication information.

Optionally, the step in which the adaptor layer header is added is performed by an adaptor layer located above a radio link control (RLC) layer; or an adaptor layer located between the RLC layer and a media access control (MAC) layer; or an adaptor layer functional entity located at the RLC layer; or an adaptor layer functional entity located at the MAC layer.

Optionally, the IAB donor includes an IAB donor centralization unit CU and/or an IAB donor distribution unit (DU).

The step in which the IAB donor transmits the data packet to the second IAB node includes steps described below.

The IAB donor CU maps the data packet to a GTP tunnel corresponding to a UE and a bearer to which the data packet belongs, transmits the mapped data packet to the IAB donor DU, the IAB donor DU transmits the data packet to a next-hop node after encapsulating an identifier of the UE and a bearer identifier in an adaptor layer header; or, the IAB donor CU carries GTP tunnel information allocated by a serving IAB node in a GTP user plane (GTP-U) header of the data packet to be transmitted to the IAB donor DU, and the IAB donor DU transmits the data packet to the next-hop node after obtaining the GTP tunnel information and encapsulating the GTP tunnel information in the adaptor layer header; or, the IAB donor CU carries first GTP tunnel information between the IAB donor CU and the IAB donor DU in the GTP-U header of the data packet transmitted to the IAB donor DU, the IAB donor DU determines second GTP tunnel information allocated by the serving IAB node corresponding to the first GTP tunnel information, and after encapsulating the second GTP tunnel information in the adaptor layer header, transmits the data packet to the next-hop node; or, the IAB donor CU transmits the data packet to the DU after adding the adaptor layer header to the data packet, where the adaptor layer header carries at least one of: a source node identifier, a target node identifier, a UE identifier to which the data packet belongs, and a bearer identifier to which the data packet belongs, a channel identifier to which the data packet belongs, routing path information, Quality of Service (QoS) related information, general packet radio service tunneling protocol (GTP) tunnel information, control plane indication information, user plane indication information or protocol type indication information; The IAB donor CU maps the data packet to the corresponding GTP tunnel, and after performing GTP-U processing and encapsulation, adds the adaptor layer header to the data packet, transmits the data packet to the IAB donor DU, where the adaptor layer header carries at least one of: the source node identifier, the target node identifier, the channel identifier to which the data packet belongs, the routing path information, the QoS related information, the GTP tunnel information, the control plane indication information, the user plane indication information or the protocol type indication information.

Optionally, the step in which the IAB donor transmits the data packet to a second IAB node further includes steps described below.

The DU receives the data packet transmitted by the IAB donor CU, and transmits the data packet to the next-hop node after adding the adaptor layer header to the data packet, where the adaptor layer header carries at least one of: the source node identifier, the target node identifier, the UE identifier to which the data packet belongs, and the bearer identifier to which the data packet belongs, the channel identifier to which the data packet belongs, the routing path information, the QoS related information, the GTP tunnel information, the control plane indication information, the user plane indication information or the protocol type indication information; or, the DU receives the data packet transmitted by the IAB donor CU, and transmits the data packet to the next-hop node after adding the adaptor layer header to the data packet, where the adaptor layer header carries at least one of: the source node identifier, the target node identifier, the channel identifier to which the data packet belongs, the routing path information, the QoS related information, the GTP tunnel information, the control plane indication information, the user plane indication information or the protocol type indication information; or, after receiving the data packet transmitted by the IAB donor CU, the DU maps the GTP tunnel between the IAB donor CU and the IAB donor DU to which the data packet belongs to the GTP tunnel between the IAB donor CU and the serving IAB node corresponding to the data packet, and transmits the data packet to the next-hop node after GTP-U encapsulation is performed and the adaptor layer header is added, where the adaptor layer header carries at least one of: the source node identifier, the target node identifier, the channel identifier to which the data packet belongs, the routing path information, the QoS related information, the GTP tunnel information, the control plane indication information, the user plane indication information or the protocol type indication information.

The embodiment of the present disclosure further provides a method for performing relay forwarding on integrated access and backhaul links (IAB), the method is applied in a downlink direction and on an IAB node side. The method includes steps described below.

In step I, an IAB node receives a data packet from an IAB donor.

In step II, the IAB node transmits the data packet to a user equipment (UE).

Optionally, the step in which the IAB node transmits the data packet to the user equipment (UE) includes a step described below.

The IAB node acquires second information from an adaptor layer header, determines a next-hop node according to the second information, and transmits the data packet to the next-hop node, where the second information includes at least one of: a source node identifier, a target node identifier, a UE identifier to which the data packet belongs, and a bearer identifier to which the data packet belongs, a channel identifier to which the data packet belongs, routing path information, Quality of Service (QoS) related information, general packet radio service tunneling protocol (GTP) tunnel information, control plane indication information, user plane indication information or protocol type indication information.

Optionally, the step in which the IAB node transmits the data packet to the user equipment (UE) includes a step described below.

After adding an adaptor layer header to the data packet, the IAB node transmits the data packet to the next-hop node, where the second information in the adaptor layer header includes at least one of: a source node identifier, a target node identifier, a UE identifier to which the data packet belongs, and a bearer identifier to which the data packet belongs, a channel identifier to which the data packet belongs, routing path information, Quality of Service (QoS) related information, general packet radio service tunneling protocol (GTP) tunnel information, control plane indication information, user plane indication information or protocol type indication information.

Optionally, the step in which the IAB node transmits the data packet to the user equipment (UE) includes a step described below.

The IAB node determines corresponding QoS related information according to a QoS flow or a bearer to which the data packet belongs or determines the QoS related information according to the second information, and maps the data packet to a radio bearer, a logical channel or the QoS flow corresponding to the QoS related information and transmits the data packet to the next-hop node; or, the IAB node determines the bearer and the UE to which the data packet belongs according to the UE identifier and the bearer identifier in the second information or according to GTP tunnel information in the second information, and then transmits the data packet to the UE through the radio bearer, the logical channel or the QoS flow corresponding to the bearer and the UE; or, the IAB node obtains the GTP tunnel information by parsing a GTP user plane (GTP-U) protocol layer, determines the bearer and the UE to which the data packet belongs according to the GTP tunnel information, and then transmits the data packet to the UE through the radio bearer, the logical channel or the QoS flow corresponding to the bearer and the UE.

The embodiment of the present disclosure further provides an information acquisition method, including a step described below.

An integrated access and backhaul (IAB) links node acquires first mapping related information; where the first mapping related information includes at least one of: mapping relationship between a QCI and a DSCP; a mapping relationship between a 5QI and a TOS; a mapping relationship between the QCI and the TOS; a mapping relationship between the 5QI and the QCI; a mapping relationship between the QCI and the QCI; a mapping relationship between the 5QI and the 5QI; a mapping relationship between a quality of service flow identifier (QFI) and the QFI; a mapping relationship between a bearer identifier and the QFI; or a mapping relationship between the bearer identifier and the bearer identifier.

In an embodiment, a manner for an integrated access and backhaul (TAB) links node acquiring first mapping related information includes at least one of steps described below.

The TAB node obtains the first mapping related information from an access side network element through radio resource control (RRC) signaling, F1 signaling, X2 signaling, Xn signaling or other interface information; the TAB node obtains the first mapping related information from a core network element through S1 signaling, NG signaling, or other interface information; or a first TAB node obtains the first mapping related information from an application server.

The embodiment of the present disclosure further provides an information acquisition method, including a step described below.

An integrated access and backhaul (TAB) links donor distribution unit (DU) acquires mapping related information; where the mapping related information includes at least one of: a mapping relationship between user equipment (UE) bearer information and general packet radio service tunneling protocol (GTP) tunnel information of an F1 interface; a mapping relationship between the GTP tunnel information of the F1 interface, a target node identifier and UE bearer information; a mapping relationship between the GTP tunnel information of the F1 interface and the target node identifier; or a mapping relationship between the GTP tunnel information of the F1 interface.

The UE bearer information includes at least one of: a UE identifier or a bearer identifier.

The GTP tunnel information of the F1 interface includes: an address and/or tunnel endpoint identifier (TEID) information.

The IAB donor DU is the TAB node, or a DU node in an IAB donor, or a DU node wiredly connected to a CU in the IAB donor.

The embodiment of the present disclosure further provides an integrated access and backhaul (IAB) links donor node in IAB, including a memory, a processor, and a computer program stored in the memory and executable on the processor, where when executing the computer program, the processor implements any method executed by the IAB node described above.

The embodiment of the present disclosure further provides an integrated access and backhaul (IAB) links donor node in IAB, including a memory, a processor, and a computer program stored in the memory and executable on the processor, where when executing the computer program, the processor implements any method executed by the IAB donor node described above.

An embodiment of the present disclosure further provides a computer-readable storage medium configured to store a computer program for executing any method described above when executed by a processor.

Embodiment One

Figure 2:
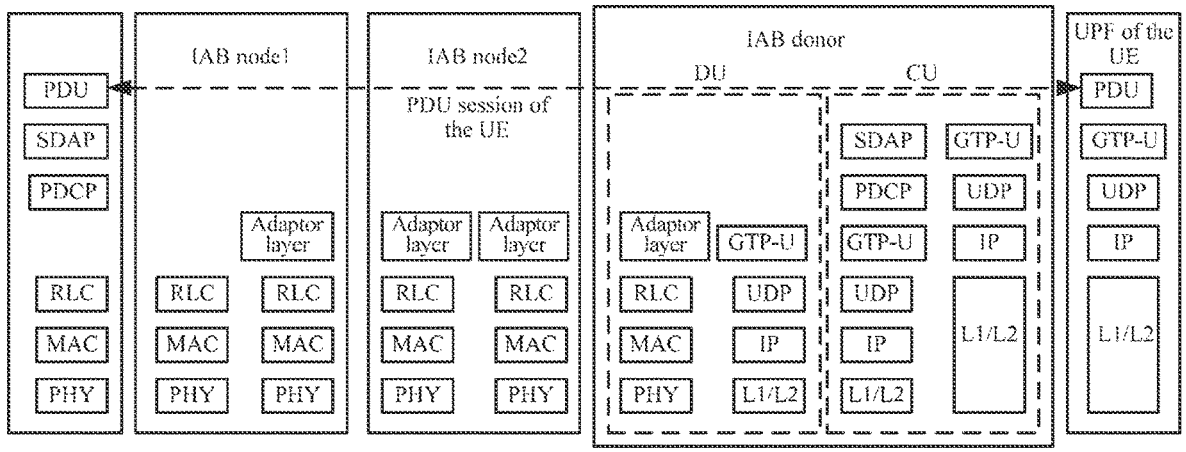
FIG. 2 is a schematic diagram of a protocol stack between a user equipment (UE) and a user plane function (UPF) according to embodiment one of the present disclosure, the CU is not configured with an adaptor layer.
Figure 3:
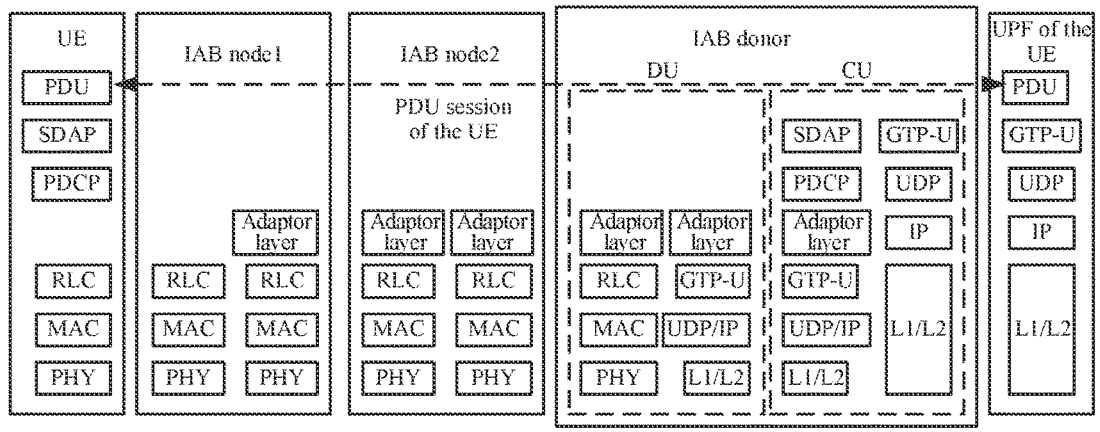
FIG. 3 is a schematic diagram of another protocol stack between the UE and the UPF according to embodiment one of the present disclosure, and the CU is configured with the adaptor layer.

This embodiment method is a method for routing according to adaptor layer information. A protocol stack between a user equipment (UE) and a user plane function (UPF) is as shown in FIGS. 2 and 3. An adaptor layer is located above a radio link control (RLC) layer of an IAB node and an IAB donor. It should be noted that the adaptor layer may also be located between the RLC layer and a media access control (MAC) layer, or an adaptor layer function is located in the RLC layer or the MAC layer.

An uplink data forwarding process using this embodiment method is as follows.

In step one, a data packet of the UE is transmitted to an IAB node 1 through an air interface after being encapsulated and processed by a corresponding protocol layer (such as a service data adaptation protocol (SDAP) layer/packet data convergence protocol (PDCP) layer/RLC layer/MAC layer/physical layer (PHY)).

In step two, after receiving the data packet from the UE and performing the corresponding parsing in the PHY/MAC/RLC layer, the IAB node 1 determines a target node and a next-hop node of the data packet according to the obtained routing information, or determines a routing path.

In this embodiment, the target node is the IAB donor, or a gNB-CU in the IAB donor, or a gNB-DU in the IAB donor, or the gNB-DU connected to the gNB-CU in the IAB donor, or a UPF, or an access and mobility management function (AMF), or a base station, or the IAB node.

The routing related information includes at least one of:
1) a target node identifier;
2) a target node address, such as a transport network layer (TNL) address or an IP address;
3) routing path information, which may include one of: a routing path identifier, a routing path number, a routing path index number, such as a path identifier or a number or index information in a routing table configured in the IAB node 1;
3) a bearer type, which includes at least one of: a master cell group (MCG) bearer, a secondary cell group (SCG) bearer, a split bearer, a master node (MN) terminated SCG bearer and a secondary node (SN) terminated MCG bearer;
4) a master base station or a master node identifier, which may be identification information of the base station or a centralized unit (CU) or a distributed unit (DU);
5) a master base station or a master node address, which may be address information of the base station or the CU or the DU;
6) a secondary base station or a secondary node identifier, which may be identification information of the base station or the CU or the DU;
7) a secondary base station or a secondary node address, which may be address information of the base station or the CU or the DU;
8) routing path information about routing to the master base station or a master node, including one of: a routing path identifier, a routing path number, a routing path index number, such as the path identifier or the number or the index information in the routing table configured in the IAB node 1;
9) routing path information about routing to the secondary base station or a secondary node, including one of: the routing path identifier, the routing path number, the routing path index number, such as the path identifier or the number or the index information in the routing table configured in the IAB node 1;
10) a next-hop node ID, where the next-hop node may be the IAB donor, or the gNB-CU in the IAB donor, or the gNB-DU in the IAB donor, or the gNB-DU connected to the gNB-CU in the IAB donor, or the UPF, or the AMF, or the base station, or the IAB node; or
11) a next-hop node address; a transport network layer (TNL) address or the IP address of the next-hop node.

In this embodiment, the IAB node 1 may obtain the routing related information from an access side network element through RRC signaling, F1 signaling, X2 signaling, or Xn signaling; where the access side network element is one of: the gNB-CU, the IAB donor, a gNB, an eNB; or the IAB node 1 may obtain the routing related information from a core network element through S1 signaling or NG signaling; or the IAB node 1 may obtain the routing related information from an application server;

12) general packet radio service tunneling protocol (GTP) tunnel information;
13) a source node identifier;
14) a source node address; or
15) a bearer identifier.

In this embodiment, the IAB node 1 may obtain the routing related information from an access side network element through the RRC signaling, the F1 signaling, the X2 signaling, or the Xn signaling; where the access side network element is one of: the gNB-CU, the IAB donor, a gNB, an eNB; or the IAB node 1 may obtain the routing related information from a core network element through S1 signaling or NG signaling; or the IAB node 1 may obtain the routing related information from an application server.

In this embodiment, the routing related information may be configured at the granularity of the UE; or the routing related information may be configured at the granularity of the UE's bearer, that is, the corresponding routing related information is configured for each UE's bearer; or the routing related information may also be configured at a granularity of a UE's bearer type, that is, the corresponding routing information is configured for each UE's bearer type. The IAB node1 may determine the target node and/or the next-hop node of the data packet according to an RLC channel or a bearer identifier or a bearer type and/or corresponding routing related information to which the data packet received from the UE belongs. Optionally, for the split bearer of the UE, the bearer's data may be forwarded to two or more different target nodes.

In step three, the IAB node 1 adds an adaptor layer header to the parsed PDCP PDU, the adaptor layer header includes at least one of: the source node identifier, the target node identifier, the UE identifier to which the data packet belongs, and the bearer identifier to which the data packet belongs, the channel identifier to which the data packet belongs, the routing path information, the Quality of Service (QoS) related information, the general packet radio service tunneling protocol (GTP) tunnel information, the control plane indication information, the user plane indication information or the protocol type indication information. The GTP tunnel information includes the TNL address and/or GTP TED information, for example, GTP tunnel information corresponding to the UE bearer allocated by a donor CU. The protocol type indication information includes one of: an F1, an F1 control plane, an F1 user plane, an IP, a non-IP, an SCTP, an NG, an S1, an Xn and an X2.

Optionally, the IAB node 1 may obtain UE bearer information and corresponding GTP tunnel information from the CU, for example, it may be obtained through the RRC signaling or the F1 signaling.

In step four, the IAB node 1 determines that the next-hop node is an IAB node 2, and then the data packet encapsulated by the adaptor layer is transmitted to the IAB node 2 through the RLC channel or the radio bearer between the IAB node 1 and the IAB node 2.

The IAB node 1 needs to map the UE's data packet to the RLC channel or the radio bearer of the IAB node 1, so as to transmit the data packet to the IAB node 2. Specifically, the IAB node 1 may map the UE's data packet to the RLC channel or the radio bearer of the IAB node 1 based on methods one to three described below.

Method one: the IAB node1 maps the UE's data packet to the corresponding bearer according to specific mapping rules.

Specifically, the IAB node1 obtains the bear identifier or a QCI or 5QI or QFI value of the QoS flow or the bearer to which the received UE data packet belongs, and then performs corresponding mappings according to configured bearer mapping relationship information. The bearer mapping relationship information includes at least one of:
a mapping relationship between a QCI and a DSCP;
a mapping relationship between the 5QI and the TOS;
a mapping relationship between the QCI and the TOS;
a mapping relationship between the 5QI and the TOS;
a mapping relationship between the 5QI and the QCI;
a mapping relationship between the QCI and the QCI;
a mapping relationship between the 5QI and the 5QI;
a mapping relationship between a quality of service flow identifier (QFI) and the QFI;
a mapping relationship between a bearer identifier and the QFI; or In a case where the IAB node1 obtains a corresponding DSCP or TOS value according to the QCI or 5QI or QFI value of the QoS flow or the bearer to which the UE data packet belongs and the bearer mapping relationship information, the IAB node 1 maps the UE data packet to the corresponding radio bearer or the RLC channel or the QoS flow of the corresponding IAB node1 according to the DSCP or TOS value and the configured packet mapping rules (such as a packet filter set or a traffic flow template (TFT)). Optionally, if the IAB node1 maps the UE data packet to the corresponding QoS flow according to the DSCP or TOS value and the configured packet mapping rules, then the IAB node1 maps the QoS flow to the radio bearer, and transmits the UE data packet to the IAB node2 through the corresponding radio bearer.

Method two: the IAB node1 obtains the QFI or 5QI or QCI value of the QoS flow or the bearer to which the received UE data packet belongs from the received UE data packet, and then maps the data packet to the RLC channel or the bearer or the QoS flow corresponding to the QCI or 5QI or QFI value in the configured QoS rules or the TFT. If the UE data packet is mapped to the corresponding QoS flow, the IAB node1 then maps the QoS flow to the radio bearer, and transmits the UE data packet to the IAB node2 through the corresponding radio bearer.

Method three: the IAB node 1 performs the corresponding mapping according to a mapping relationship between a logic channel of the IAB node 1 and a logical channel of the configured UE (such as a mapping relationship between logical channel IDs (LCIDs)) or a mapping relationship between a radio bearer of the IAB node 1 and a radio bearer of the UE (such as a mapping relationship between radio bearer IDs (RBIDs)). The mapping relationship may be a predefined or one-to-one correspondence relationship, or the mapping relationship may be configured in one of the following manners: the F1 signaling, the RRC signaling, the X2 signaling, the Xn signaling, the S1 signaling and the NG signaling.

In step five, the IAB node 2 parses the data packet in a corresponding protocol layer (such as the PHY/MAC/RLC/adaptor layer) after receiving the data packet, and obtains information in the adaptor layer header such as the source node identifier, the target node identifier, the UE identifier to which the data packet belongs, and the bearer identifier to which the data packet belongs, the channel identifier to which the data packet belongs, the routing path information, the Quality of Service (QoS) related information, the general packet radio service tunneling protocol (GTP) tunnel information, the control plane indication information, the user plane indication information or the protocol type indication information. Alternatively, the IAB node 2 only reads the information in the adaptor layer header, but does not remove the adaptor layer header. In this case, the IAB node 2 does not encapsulate the adaptor layer header. The IAB node 2 determines the target node according to the information in the adaptor layer header, and determines the next-hop node as the target node (donor DU) by checking the routing table.

Optionally, the IAB node 2 adds the adaptor layer header to the data packet, where the adaptor layer header includes at least one of: the source node identifier, the target node identifier, the UE identifier to which the data packet belongs, the bearer identifier to which the data packet belongs, the channel identifier to which the data packet belongs, the routing path information, the Quality of Service (QoS) related information, the general packet radio service tunneling protocol (GTP) tunnel information, the control plane indication information, the user plane indication information, or the protocol type indication information.

The IAB node 2 transmits the encapsulated data packet to the IAB donor through the RLC channel or the radio bearer between the IAB node 2 and the IAB donor. The mapping between the RLC channel/radio bearer of the IAB node 1 and the RLC channel/radio bearer of the IAB node 2 may refer to the method in the step four. The IAB node 2 performs the corresponding RLC/MAC/PHY processing on the data packet and transmits the data packet to the IAB donor DU (the DU in the IAB donor or the DU connected to the CU in the IAB donor).

In step six, the IAB donor DU parses the data packet in the PHY/MAC/RLC/adaptor layer and obtains at least one piece of the following information: the source node identifier, the target node identifier, the UE identifier to which the data packet belongs, and the bearer identifier to which the data packet belongs, the channel identifier to which the data packet belongs, the routing path information, the Quality of Service (QoS) related information, the general packet radio service tunneling protocol (GTP) tunnel information, the control plane indication information, the user plane indication information or the protocol type indication information. The IAB donor DU transmits the data packet to the IAB donor CU through an F1-U GTP tunnel between the IAB donor DU and the CU. The IAB donor DU needs to acquire mapping related information (such as acquiring from the IAB donor CU), and the mapping related information includes at least one of: a mapping relationship between user equipment (UE) bearer information and general packet radio service tunneling protocol (GTP) tunnel information of an F1 interface; a mapping relationship between the GTP tunnel information of the F1 interface, a target node identifier and UE bearer information; a mapping relationship between the GTP tunnel information of the F1 interface and the target node identifier; or a mapping relationship between the GTP tunnel information of the F1 interface.

The UE bearer information includes at least one of: a UE identifier or a bearer identifier.

The GTP tunnel information of the F1 interface includes: an address or tunnel endpoint identifier (TEID) information.

The IAB donor DU is the IAB node, a DU node in an IAB donor, and a DU node wiredly connected to a CU in the IAB donor.

In FIG. 2, L1 represents the physical layer in a protocol stack model, and L2 represents a link layer in the protocol stack model.

In an architecture of FIG. 2, there is no adaptor layer on the CU. The IAB donor DU maps each radio bearer of each UE to the F1-U GTP tunnel. The CU may be enabled to identify the UE and the bearer to which the data packet belongs in three methods described below.

Method one, the donor DU obtains a signaling radio bearer (SRB) ID or a data radio bearer (DRB) ID of the UE and F1 GTP tunnel information corresponding to the donor DU from the donor CU. After receiving the data packet, the IAB donor DU acquires the UE and the bearer identifier carried in the adaptor layer header. The IAB donor DU may map the data packet to the corresponding F1 GTP tunnel and transmit the data packet to the donor CU according to the acquired mapping relationship between the SRB/DRB and the F1GTP tunnel, so that the CU may identify the UE and the bearer to which the data packet belongs according to tunnel information in a GTP-U (also referred to as tunnel information in a GTP-U packet header), and deliver the data packet to a PDCP entity for the corresponding bearer of the corresponding UE.

Method two, after receiving the data packet, the donor DU acquires the GTP tunnel information (the TNL address and/or the GTP TEID) carried in the adaptor layer header, then when the donor DU performs processing and encapsulation in the GTP-U protocol layer, the donor DU transmits the GTP tunnel information which is in the adaptor layer header and included in the GTP-U packet header to the donor CU, so that the CU may identify the UE and the bearer to which the data packet belongs according to the GTP-U header information and delivers the data packet to the PDCP entity for the corresponding bearer of the corresponding UE.

Method three, after receiving the data packet, the donor DU acquires the GTP tunnel information (the TNL address and/or the GTP TEID) carried in the adaptor layer header. Then when performing the processing and encapsulation in the GTP-U protocol layer, according to the GTP tunnel mapping information configured for the donor DU by the CU, the donor DU transmits the data packet included in the GTP-U packet header through the GTP tunnel information between the donor DU and the donor CU corresponding to the GTP tunnel information in the adaptor layer header to the donor CU, so that the CU may identify the UE and bearer to which the data packet belongs according to the GTP tunnel information, and deliver the data packet to the PDCP entity for the corresponding bearer of the corresponding UE.

In an architecture of FIG. 3, optionally, the IAB donor DU encapsulates the adaptor layer header for the data packet. The adaptor layer header includes at least one of: the target node identifier, the UE identifier to which the data packet belongs, the bearer identifier to which the data packet belongs, the channel identifier to which the data packet belongs, the routing path information or the GTP tunnel information. Alternatively, the IAB donor DU only reads the information in the adaptor layer header, but does not remove the adaptor layer header. In this case, the IAB donor DU does not encapsulate the adaptor layer header. The IAB donor DU transmits the data to the IAB donor CU through the F1-U GTP tunnel.

In step seven, in the architecture of FIG. 2, the donor CU identifies the UE and the bearer to which the data packet belongs according to the GTP-U tunnel information, and delivers the UE data packet to the PDCP entity for the corresponding bearer of the corresponding UE to perform subsequent parsing.

In the architecture of FIG. 3, the donor CU parses the adaptor layer header and obtains at least one of: the source node identifier, the target node identifier, the UE identifier to which the data packet belongs, the bearer identifier to which the data packet belongs, the channel identifier to which the data packet belongs, the routing path information, the QoS related information, the GTP tunnel information, the control plane indication information, the user plane indication information or the protocol type indication information. After identifying the UE and the bearer to which the data packet belongs, the donor CU delivers the UE data packet to the PDCP entity for the corresponding bearer of the corresponding UE to perform the subsequent parsing.

Then the SDAP layer of the donor CU finds an NG GTP-U tunnel corresponding to a PDU session according to a RB ID to which the data packet belongs and a flow ID of the UE in the SDAP packet header, and transmits the UE data to the UPF through the NG GTP tunnel.

A downlink data forwarding process using this embodiment method is as follows. It should be noted that steps described below may be used in any combination.

In step one, after receiving the UE data from the UPF, the IAB donor CU determines the QoS flow of the PDU session corresponding to the UE data packet according to the QFI in the data packet header, and then maps the QoS flow to the corresponding radio bearer. The IAB donor needs to determine the target node of the data packet. In this case, the target node of the data packet is the serving IAB node of the UE (i.e., the IAB node 1). For example, the IAB donor may determine the target node (the serving IAB node) of the data packet according to serving IAB node information in a UE context, or serving IAB node information corresponding to the radio bearer, or serving IAB node information corresponding to the bearer type. The IAB donor CU transmits the UE data packet to the IAB donor DU (i.e., the DU in the IAB donor or the DU connected to the CU in the IAB donor).

If the architecture shown in FIG. 2 is adopted, there is no adaptor layer on the CU, and the donor CU transmits the UE data to the donor DU through an F1 GTP bearer.

In step two, the DU in the IAB donor or the DU connected to the CU in the IAB donor receives the data packet. Optionally, the IAB donor DU acquires the mapping related information (such as acquiring from the IAB donor CU), and the mapping related information includes at least one of: a mapping relationship between user equipment (UE) bearer information and general packet radio service tunneling protocol (GTP) tunnel information of an F1 interface; a mapping relationship between the GTP tunnel information of the F1 interface, a target node identifier and UE bearer information; a mapping relationship between the GTP tunnel information of the F1 interface and the target node identifier; or a mapping relationship between the GTP tunnel information of the F1 interface. The UE bearer information includes at least one of: a UE identifier or a bearer identifier; the GTP tunnel information of the F1 interface includes: an address and/or tunnel endpoint identifier (TED) information.

The IAB donor DU is the IAB node, or a DU node in an IAB donor, or a DU node wiredly connected to a CU in the IAB donor.

Optionally, the IAB node 1 identifies the UE and/or the bearer and/or the target node to which the data packet belongs according to the above mapping related information. The IAB node 1 may be encapsulated in the adaptor layer in one of methods described below.

Method one: the donor DU acquires the mapping relationship among the UE, the bearer and the GTP tunnel from the CU, and then determines the UE and the bearer to which the data packet belongs according to the GTP tunnel information. Then the donor DU encapsulates the UE identifier and the bearer identifier in the adaptor layer header. Optionally, the adaptor layer header also includes the target node identifier and/or path information, etc.

Method two: the GTP-U header of the data packet transmitted by the donor CU to the donor DU includes the GTP tunnel information (the TNL address and/or the GTP TEID) allocated by the IAB node 1, and the donor DU obtains the GTP tunnel information after parsing and encapsulates the GTP tunnel information allocated by the IAB node 1 in the adaptor layer header.

Method three: the donor DU acquires GTP tunnel information between the donor DU and the donor CU and GTP tunnel information between the corresponding IAB node 1 and the donor CU from the CU. After receiving the UE data packet from the CU, the donor DU determines a GTP tunnel between the IAB node 1 and the donor CU corresponding to a GTP tunnel between the donor CU and the donor DU to which the data packet belongs, and encapsulates the tunnel information (the GTP tunnel between the IAB node 1 and the donor CU) in the adaptor layer header.

If the architecture of FIG. 3 is adopted, that is, the adaptor layer is provided on the CU, and the CU in the IAB donor adds the adaptor layer header for each PDCP PDU. The adaptor layer header includes at least one of: the source node identifier, the target node identifier, the UE identifier to which the data packet belongs, the bearer identifier to which the data packet belongs, the channel identifier to which the data packet belongs, the routing path information, the QoS related information, the GTP tunnel information, the control plane indication information, the user plane indication information or the protocol type indication information.

Alternatively, if the architecture shown in FIG. 3 is adopted, that is, the adaptor layer is provided on the CU, the CU in the IAB donor adds the adaptor layer header to each PDCP PDU. The adaptor layer header includes at least one of: the target node identifier, the UE identifier to which the data packet belongs, the bearer identifier to which the data packet belongs, the channel identifier to which the data packet belongs, the routing path information and the QoS related information. The QoS related information is the QCI or 5QI value of the UE data packet.

The IAB donor DU determines that the next-hop node is the IAB node 2. Optionally, the IAB donor DU maps the data packet to the QoS flow/bearer of the IAB node 2 with the corresponding QCI or 5QI value according to the DSCP or TOS information and a mapping relationship between the configured DSCP/TOS and QCI/5QI in an IP header and transmits the data packet to the IAB node 2.

In step three, after receiving the data packet, the IAB node 2 obtains at least one of the following information by parsing the adaptor layer: the source node identifier, the target node identifier, the UE identifier to which the data packet belongs, the bearer identifier to which the data packet belongs, the channel identifier to which the data packet belongs, the routing path information, the QoS related information, the GTP tunnel information, the control plane indication information, the user plane indication information or the protocol type indication information. The IAB node 2 determines a next-hop routing node (the IAB node 1) according to the above information and the routing table. Optionally, the IAB node 2 performs encapsulation in the adaptor layer, where the adaptor layer header includes at least one of: the source node identifier, the target node identifier, the UE identifier to which the data packet belongs, the bearer identifier to which the data packet belongs, the channel identifier to which the data packet belongs, the routing path information, the Quality of Service (QoS) related information, the general packet radio service tunneling protocol (GTP) tunnel information, the control plane indication information, the user plane indication information, or the protocol type indication information. Optionally, the IAB node 2 determines QoS information (the QCI or 5QI or QFI value) according to the bearer or QoS flow to which the received data packet belongs, or determines the QoS information according to adaptor layer header information of the received data packet, and then maps the data packet on the QoS flow/bearer of the IAB node 1 with the corresponding QCI or 5QI or QF value and transmits the data packet to the IAB node 1.

In step four, after receiving the data packet, the IAB node 1 obtains at least one of the following information by parsing the adaptor layer: the source node identifier, the target node identifier, the UE identifier to which the data packet belongs, the bearer identifier to which the data packet belongs, the channel identifier to which the data packet belongs, the routing path information, the QoS related information, the GTP tunnel information, the control plane indication information, the user plane indication information or the protocol type indication information. The IAB node 1 determines the UE and the bearer to which the data packet belongs according to the UE identifier and bearer identifier information carried in the adaptor layer header of the received data packet; or the IAB node 1 determines the UE and the bearer to which the data packet belongs according to the GTP tunnel information carried in the adaptor layer header of the received data packet and transmits the UE data packet to the UE through the corresponding QoS flow/RLC channel/bearer of the corresponding UE.

Embodiment Two: GTP-U+Adaptor Layer

Figure 4A:
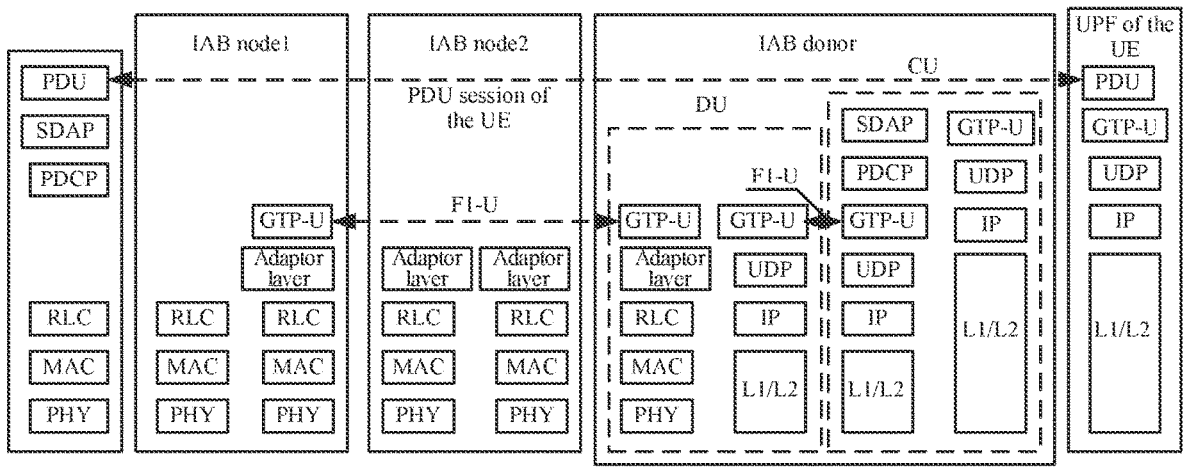
FIG. 4A is a schematic diagram of a protocol stack between the UE and the UPF according to embodiment two of the present disclosure, a GTP user plane (GTP-U) protocol layer exists above the adaptor layer, and the CU is not configured with the adaptor layer.

This embodiment method is a second method for routing according to adaptor layer information. The difference from the embodiment one lies in that: a GTP-U protocol layer is provided above an adaptor layer, that is, an F1 GTP tunnel needs to be established between an IAB node 1 and an IAB donor, and the tunnel is used for transmitting a data packet of a UE. A protocol stack between the UE and a UPF is shown in FIG. 4 and FIG. 5. In FIG. 4 and FIG. 5, the adaptor layer is located above an RLC layer of an IAB node and the IAB donor. It should be noted that, in other embodiments, the adaptor layer may also be located between the RLC layer and a media access control (MAC) layer, or an adaptor layer function is located in the RLC layer or the MAC layer.

A difference from the method in the embodiment one includes that F1-U data between the IAB node 1 and the IAB donor is carried by an F1 GTP-U tunnel. The F1 GTP-U tunnel one-to-one corresponds to a bearer of the UE, which may be used for identifying the UE and the bearer to which the data packet belongs. Therefore, an adaptor layer header does not need to include a UE identifier and a bearer identifier. In addition, the method in the embodiment one is also applicable to embodiment two.

Figure 4B:
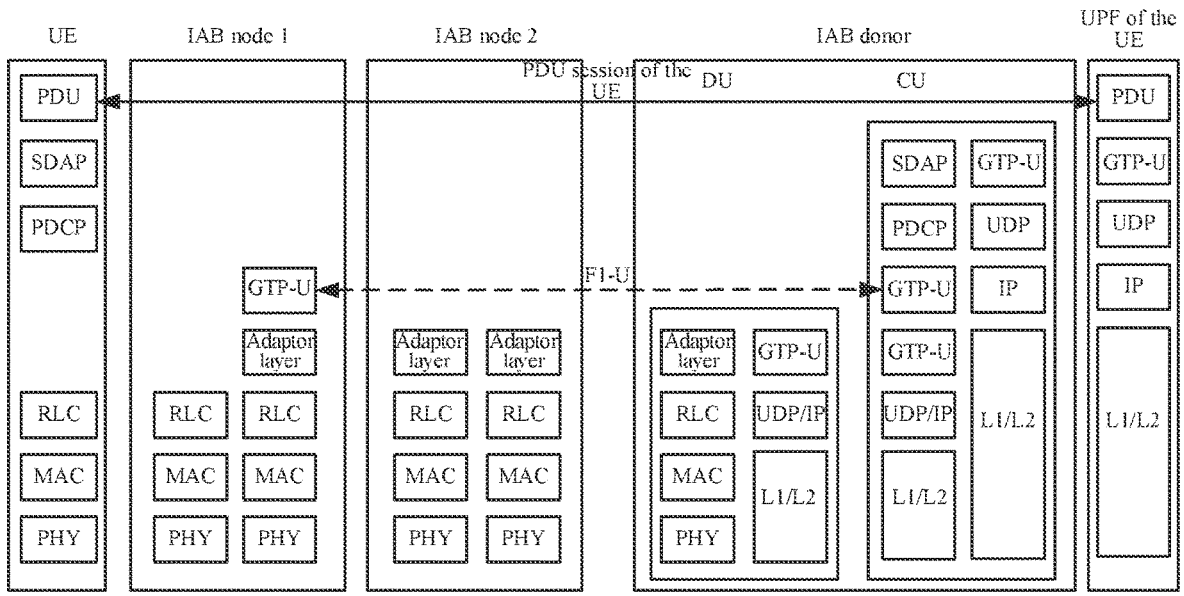
FIG. 4B is a schematic diagram of another protocol stack between the UE and the UPF according to embodiment two of the present disclosure.
Figure 5:
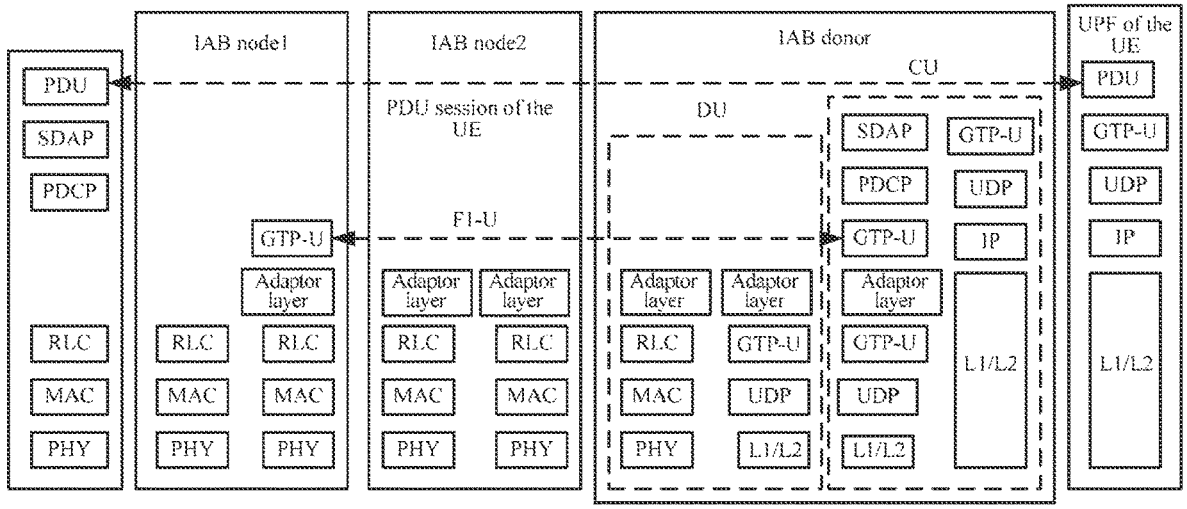
FIG. 5 is a schematic diagram of another protocol stack between the UE and the UPF according to embodiment two of the present disclosure, the GTP-U protocol layer exists above the adaptor layer, and the CU is configured with the adaptor layer.

Two modes of protocol stacks of a donor CU and a donor DU are provided, as shown in FIG. 4 and FIG. 5 respectively. In addition, a protocol stack architecture method shown in FIG. 4B is also used. In the method shown in FIG. 4, after the data reaches the IAB donor, the donor DU transmits data of the UE's F1 GTP-U tunnel (a F1-U tunnel, i.e., a GTP tunnel of an F1 interface) to the donor CU through another F1-U tunnel. Two F1-U tunnels are in one-to-one correspondence to each other. Then the Donor CU may identify the UE and the bearer to which the data packet belongs through TED information in the F1-U tunnel, and then may deliver the data packet to a corresponding PDCP entity.

An uplink data forwarding process using this embodiment method is as follows. It should be noted that steps described below may be used in any combination.

In step one, after the UE's data packet is encapsulated and processed by a corresponding protocol layer (such as an SDAP/PDCP/RLC/MAC/PHY), the UE's data packet is transmitted to the IAB node 1 through an air interface.

In step two, after receiving the UE's data and performing the corresponding PHY/MAC/RLC analysis, the IAB node 1 determines a target node and a next-hop node of the data packet according to the obtained routing information, or determines a routing path.

For contents included in routing related information, reference may be made to description in Example one. The IAB node 1 may obtain the routing related information from an access side network element through RRC signaling, F1 signaling, X2 signaling, or Xn signaling; where the access side network element is one of: a gNB-CU, the IAB donor, a gNB, and an eNB; or the IAB node 1 may obtain the routing related information from a core network element through S1 signaling or NG signaling; or the IAB node 1 obtains the routing related information from an application server;

The routing related information may be configured at a granularity of the UE; or the routing related information may be configured for each UE's bearer, that is, the corresponding routing related information is configured for each UE's bearer; or the routing related information may also be configured for each UE's bearer type, that is, the corresponding routing information is configured for each UE's bearer type. The IAB node1 may determine the target node and/or the next-hop node of the data packet according to an RLC channel or a bearer identifier or a bearer type and/or the routing related information to which the data packet received from the UE belongs. Optionally, for a split bearer of the UE, the bearer's data may be forwarded to two or more different target nodes.

In step three, the IAB node 1 maps the parsed PDCP PDU to the corresponding F1 GTP tunnel according to a mapping relationship between the configured radio bearer and the F1 GTP tunnel. After performing the GTP-U processing and encapsulation, the IAB node 1 performs the adaptor layer processing and encapsulation on the data packet, i.e., adds the adaptor layer header to the UE data packet. The adaptor layer header includes at least one piece of the following information: a target node identifier, and routing path information. Optionally, the IAB node 1 may obtain UE bearer information and corresponding GTP tunnel information from the CU in a UE context setup request of the F1 signaling.

In step four, the IAB node 1 determines that the next-hop node is an IAB node 2, and then the data packet encapsulated by the adaptor layer is transmitted to the IAB node 2 through the RLC channel or the radio bearer between the IAB node 1 and the IAB node 2.

The IAB node 1 needs to map the UE's data packet to the RLC channel or the radio bearer of the IAB node 1 and transmits the data packet to the IAB node 2 (Ibid). Specifically, the IAB node 1 may map the UE's data packet to the RLC channel or the radio bearer of the IAB node 1 based on methods described below.

Method one: the IAB node1 maps the UE's data packet to the corresponding bearer according to a specific mapping rule.

Specifically, the IAB node1 obtains a 5QI or QCI value of a QoS flow or the bearer to which the UE data packet belongs from the received UE data packet. Then according to a mapping relationship between the configured QCI and a differentiated services code point (DSCP), or a mapping relationship between the 5QI and the DSCP, or a mapping relationship between the QCI and type of service (TOS), or a mapping relationship between the 5QI and the TOS, the corresponding DSCP or a TOS value are obtained. Then the IAB node1 maps the UE data packet to the bearer or the QoS flow of the corresponding IAB node1 according to the DSCP or the TOS value and the configured packet mapping rules (such as a packet filter set, or a TFT). Optionally, if the IAB node 1 maps the UE data packet to the corresponding QoS flow according to the DSCP or TOS value and the configured packet mapping rules, then the IAB node 1 maps the QoS flow to the radio bearer, and transmits the UE data packet to the IAB node 2 through the corresponding radio bearer.

Method two: the IAB node 1 obtains a 5QI or QCI value of a QoS flow or the bearer to which the UE data packet belongs from the received UE data packet, and then maps the data packet to the bearer or the QoS flow corresponding to the QCI or 5QI value in the configured QoS rules or the TFT. Optionally, if the UE data packet is mapped to the corresponding QoS flow, the IAB node 1 then maps the QoS flow to the radio bearer, and transmits the UE data packet to the IAB node 2 through the corresponding radio bearer.

Method three: the IAB node 1 performs the corresponding mapping according to a mapping relationship between a logic channel of the IAB node 1 and a logical channel of the configured UE (such as a mapping relationship between logical channel IDs (LCIDs)) or a mapping relationship between a radio bearer of the IAB node 1 and a radio bearer of the UE (such as a mapping relationship between radio bearer IDs (RBIDs)). The mapping relationship may be a predefined or one-to-one correspondence relationship, or the mapping relationship may be configured in one of the following manners: the F1 signaling, the RRC signaling, the X2 signaling, the Xn signaling, the S1 signaling and the NG signaling.

In step five, after receiving the data packet, the IAB node 2 parses the corresponding protocol layer (such as a PHY/MAC/RLC/adaptor layer), obtains information in the adaptor layer header, such as the target node identifier, the UE identifier to which the data packet belongs, the bearer identifier to which the data packet belongs, a channel identifier to which the data packet belongs and the routing path information. Alternatively, the IAB node 2 only reads the information in the adaptor layer header, but does not remove the adaptor layer header. In this case, the IAB node 2 does not encapsulate the adaptor layer header. The IAB node 2 determines the target node according to the information in the adaptor layer header, and determines the next-hop node as the target node (donor DU) by checking the routing table.

Optionally, the IAB node 2 adds the adaptor layer header to the data packet, the adaptor layer header includes at least one of: the target node identifier, the channel identifier to which the data packet belongs and the routing path information. The IAB node 2 transmits the encapsulated data packet to the IAB donor through the RLC channel or the radio bearer between the IAB node 2 and the IAB donor. The mapping between the RLC channel/radio bearer of the IAB node 1 and the RLC channel/radio bearer of the IAB node 2 may refer to the method in the step four. The IAB node 2 performs the corresponding RLC/MAC/PHY processing on the data packet and transmits the data packet to an IAB donor DU (the DU in the IAB donor or the DU connected to the CU in the IAB donor).

In step six, the IAB donor DU parses the PHY/MAC/RLC/adaptor layer and the GTP-U on the data packet to obtain at least one piece of the following information: the target node identifier, the UE identifier to which the data packet belongs, the bearer identifier to which the data packet belongs, the channel identifier to which the data packet belongs, the routing path information, the routing path information, and GTP-U tunnel information.

In an architecture of FIG. 4, there is no adaptor layer on the CU. The IAB donor DU transmits the data packet to the IAB donor CU through an F1-U GTP tunnel between the IAB donor DU and the IAB donor CU. The IAB donor DU maps each radio bearer of each UE to the F1-U GTP tunnel. After receiving the data packet, the donor DU determines a GTP tunnel to which the data packet belongs, and then the donor DU maps the GTP tunnel between the IAB node 1 and the donor DU to the corresponding GTP tunnel between the donor DU and the donor CU and transmits the GTP tunnel to the donor CU, and the mapping relationship may be configured by the donor CU.

In an architecture of FIG. 5, the IAB donor DU encapsulates the adaptor layer header for the data packet, the adaptor layer header includes at least one of: the target node identifier and the routing path information. Alternatively, the IAB donor DU only reads the information in the adaptor layer header, but does not remove the adaptor layer header. In this case, the IAB donor DU does not encapsulate the adaptor layer header. The IAB donor DU transmits the data to the IAB donor CU through the F1-U GTP tunnel.

In step seven, in the architecture of FIG. 4, the donor CU identifies the UE and the bearer to which the data packet belongs according to tunnel information in a GTP-U header, and delivers the UE data packet to the PDCP entity for the corresponding bearer of the corresponding UE to perform subsequent parsing.

In the architecture of FIG. 5, the donor CU obtains at least one of the following information by parsing the adaptor layer: the target node identifier and the routing path information. After the donor CU obtains the GTP-U tunnel to which the data packet belongs and the corresponding UE and the bearer to which the data packet belongs by parsing the GTP-U protocol layer, the donor CU delivers the UE data packet to the PDCP entity for the corresponding bearer of the corresponding UE to perform the subsequent parsing.

Then the SDAP layer of the donor CU finds an NG GTP-U tunnel corresponding to a PDU session according to a RB ID to which the data packet belongs and a flow ID of the UE in the SDAP packet header, and transmits the UE data to the UPF through the NG GTP tunnel.

A downlink data forwarding process using this embodiment method is as follows. It should be noted that steps described below may be used in any combination.

A difference from the embodiment one is that the F1-U data between the IAB node1 and the IAB donor is carried by the F1 GTP-U tunnel. The F1 GTP-U tunnel one-to-one corresponds to a bearer of the UE, which may be used for identifying the UE and the bearer to which the data packet belongs. Therefore, an adaptor layer header does not need to include a UE identifier and a bearer identifier.

In step one, after receiving the UE data from the UPF, the CU in the IAB donor determines the QoS flow of the PDU session corresponding to the UE data packet according to the QFI in the data packet header, and then maps the QoS flow to the corresponding radio bearer. The IAB donor needs to determine the target node of the data packet. In this case, the target node of the data packet is the serving IAB node of the UE (i.e., the IAB node 1). The IAB donor may determine the target node (the serving IAB node) of the data packet according to or serving IAB node information corresponding to the radio bearer, or serving IAB node information corresponding to the bearer type, or serving IAB node information in a UE context. The CU in the IAB donor transmits the UE data packet to the DU in the IAB donor or the DU connected to the CU in the IAB donor.

If the architecture shown in FIG. 4 is adopted, there is no adaptor layer on the CU, and the donor CU transmits the UE data to the donor DU through an F1 GTP bearer.

If the architecture of FIG. 5 is adopted, that is, there is the adaptor layer on the CU, the CU in the IAB donor maps the PDCP PDU to the corresponding F1-U tunnel, and adds the adaptor layer header and transmits the adaptor layer header to the donor DU after the GTP-U processing and encapsulation. The adaptor layer header includes at least one of: the target node identifier, the routing path information, and QoS related information. The QoS related information is the QCI or 5QI value of the UE data packet.

In step two, if the architecture shown in FIG. 4 is adopted, the donor DU acquires GTP tunnel information between the donor DU and the donor CU and GTP tunnel information between the corresponding TAB node 1 and the donor CU from the CU. After receiving the UE data packet from the CU, the donor DU determines a GTP tunnel between the TAB node 1 and the donor CU corresponding to a GTP tunnel between the donor CU and the donor DU to which the data packet belongs, and maps the tunnel (the GTP tunnel between the TAB node 1 and the donor CU) to the corresponding GTP tunnel between the donor DU and the TAB node 1 and performs the corresponding GTP-U encapsulation. And then the adaptor layer processing and encapsulation are performed. The added adaptor layer header includes at least one of: the target node identifier, the routing path information and the QoS related information. The QoS related information is the QCI or 5QI value of the UE data packet. Optionally, the DU maps the data packet to the QoS flow/bearer of the TAB node 2 with the corresponding QCI or 5QI value according to the DSCP or TOS information in the IP packet header and transmits the data packet to the TAB node 2.

If the architecture shown in FIG. 5 is adopted, after receiving the UE data packet from the CU, the donor DU obtains at least one of the following information by parsing the adaptor layer: the target node identifier, the routing path information, and the QoS related information. The donor DU determines a next-hop routing node (the TAB node 2) according to the above information and the routing table. Optionally, the donor DU performs the adaptor layer protocol encapsulation. The adaptor layer header includes at least one of: the target node identifier, the routing path information and the QoS related information. Optionally, the donor DU determines QoS information of the received data packet according to adaptor layer header information of the received data packet, or maps the data packet to the QoS flow/bearer of the TAB node 1 with the corresponding QCI or 5QI value according to the DSCP or TOS information in the IP header, and transmits the data packet to the IAB node 2.

In step three, after receiving the data packet, the IAB node 2 obtains at least one of the following information by parsing the adaptor layer: the target node identifier, the routing path information, and the QoS related information. The IAB node 2 determines a next-hop routing node (the IAB node 1) according to the above information and the routing table. Optionally, the IAB node 2 performs the adaptor layer protocol encapsulation. The adaptor layer header includes at least one of: the target node identifier, the routing path information and the QoS related information. Optionally, the IAB node 2 determines QoS information (the QCI or 5QI value) according to the bearer or QoS flow to which the received data packet belongs, or determines the QoS information according to adaptor layer header information of the received data packet, and then maps the data packet on the QoS flow/bearer/logic channel of the IAB node 1 with the corresponding QCI or 5QI value and transmits the data packet to the IAB node 1.

In step four, after receiving the data packet, the IAB node 1 obtains at least one of the following information by parsing the adaptor layer: the target node identifier, the routing path information, and the QoS related information. Then the IAB node 1 may obtain the UE and bearer to which the data packet belongs by parsing the GTP-U protocol layer, and then transmits the UE data packet to the UE through the corresponding QoS flow/RLC channel/bearer corresponding to the UE.

Embodiment Three: PDU Session+Adaptor

Figure 6:
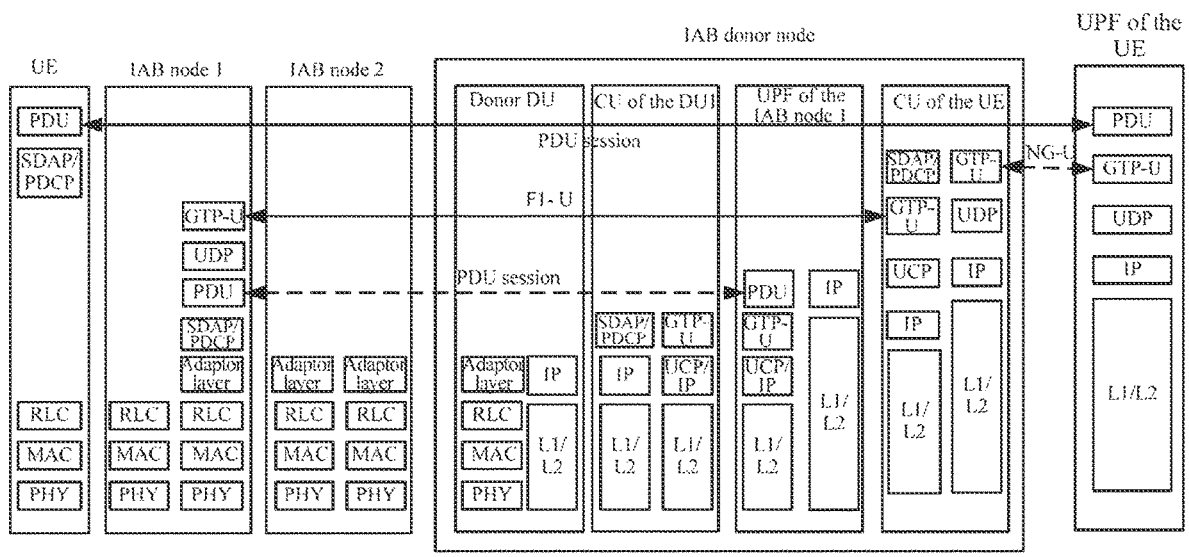
FIG. 6 is a schematic diagram of a protocol stack between the UE and the UPF according to embodiment three of the present disclosure.

This embodiment method is a method three for routing according to adaptor layer information. A protocol stack between a UE and a UPF is shown in FIG. 6. In FIG. 6, the adaptor layer is located above an RLC layer of an IAB node and an IAB donor. It should be noted that the adaptor layer may also be located between the RLC layer and a media access control (MAC) layer, or an adaptor layer function is located in the RLC layer or the MAC layer.

The difference from methods in the embodiments one and two is that F1-U data between an IAB node1 and the IAB donor is carried by a PDU session of the IAB node 1, and an adaptor layer header does not need to include a UE identifier and a bearer identifier. In addition, the method in the embodiment two is also applicable to embodiment three.

After receiving uplink data of the UE, the IAB node 1 corresponds a PDCP PDU to a corresponding F1-U GTP tunnel after parsing out the PDCP PDU. And then the IAB node takes an F1-U packet of the encapsulated UE as data of the IAB node itself that serves as the UE, and the IAB node transmits the data to the UPF of the IAB node itself through the PDU session of the IAB node itself, and the data may need to be forwarded by an intermediate IAB node during the transmission. The IAB node 1 needs to map the UE's F1-U GTP bearer to a QoS flow or bearer of the IAB node 1. Optionally, the IAB node 1 may map the data packet to the corresponding QoS flow or bearer according to QoS information (QCI or 5QI) of the bearer to which the data packet received from the UE belongs and a packet filter set (including an IP packet filter set and an Ethernet packet filter set) in QoS rules. Alternatively, the IAB node 1 may determine the corresponding DSCP/TOS value according to the QoS information of the bearer to which the data packet received from the UE belongs and a mapping relationship between the QoS information and a DSCP/TOS, and then map the UE data packet to the corresponding QoS flow or bearer according to the DSCP/TOS. If the IAB node1 maps the UE data packet to the QoS flow, the IAB node1 also needs to map the QoS flow to a DRB of the IAB node1. After the corresponding PDCP processing, the IAB node1 adds the adaptor layer header, and the added adaptor layer header includes target node identifier information and/or routing path information.

One or more intermediate IAB nodes route the data packet to the donor DU according to routing information in the adaptor layer. A CU function of the UE in the IAB donor may identify the UE and the bearer to which the data packet belongs according to GTP-U header information (such as an F1 GTP TEID), and deliver the data packet to a PDCP entity for the corresponding bearer.

It will be understood by those of ordinary skill in the art that functional modules/units in all or part of the steps of the method, the system and the apparatus disclosed above may be implemented as software, firmware, hardware and appropriate combinations thereof. In the hardware implementation, the division of the functional modules/units mentioned in the above description may not correspond to the division of physical components. For example, one physical component may have several functions, or one function or step may be implemented jointly by several physical components. Some or all components are implemented as software executed by processors such as central processing units, digital signal processors or microcontrollers, hardware, or integrated circuits such as application specific integrated circuits. Such software may be distributed on a computer-readable medium. The computer-readable medium may include a computer storage medium (or a non-transitory medium) and a communication medium (or a transitory medium). As is known to those of ordinary skill in the art, the term "computer storage medium" includes volatile and nonvolatile, removable and non-removable media implemented in any method or technology for storing information (such as computer-readable instructions, data structures, program modules or other data). The computer-storage medium include, but is not limited to, a random access memory (RAM), a read-only memory (ROM), an electrically erasable programmable read-only memory (EEPROM), a flash memory, or other memory technologies, a compact disc read-only memory (CD-ROM), a digital versatile disc (DVD) or other optical disc storage, a magnetic cassette, a magnetic tape, disk storage or other magnetic storage apparatus, or any other medium used to store the desired information and accessible by a computer. Additionally, as is known to those of ordinary skill in the art, the communication medium generally includes computer-readable instructions, data structures, program modules or other data in modulated data signals such as carriers or other transmission mechanisms, and may include any information delivery medium.

The invention claimed is:

1. A method for performing data forwarding on integrated access and backhaul (IAB) links, comprising:
receiving, by a first network element of an IAB donor, a data packet from a first IAB node according to routing related information, wherein the data packet comprises an adaptor layer header including a target node identifier and routing path information; and
transmitting, by the first network element of the IAB donor, the data packet to a second network element of the IAB donor.

2. The method of claim 1, further comprising obtaining, by the first network element of the IAB donor, mapping related information from at least one of an access side network or a core network.

3. The method of claim 2, wherein the mapping related information is between a general packet radio service tunneling protocol (GTP) tunnel information of an F1 interface and the target node identifier.

4. The method of claim 3, wherein the GTP tunnel information of the F1 interface includes an address.

5. The method of claim 1, wherein the adaptor layer header is added by the first IAB node to include the target node identifier and the routing path information.

6. The method of claim 1, wherein the adaptor layer header is added by an adaptor layer located above a radio link control (RLC) layer.

7. The method of claim 1, wherein the first network element of the IAB donor is an IAB donor distributed unit (DU) and the second network element of the IAB donor is an IAB donor centralized unit (CU).

8. A device to perform data forwarding, comprising:
at least one processor of a first network element of an integrated access and backhaul (IAB) donor, configured to:
receive a data packet from a first IAB node according to routing related information, wherein the data packet comprises an adaptor layer header including a target node identifier and routing path information; and
transmit the data packet to a second network element of the IAB donor according to the routing path information.

9. The device of claim 8, wherein the at least one processor is further configured to obtain mapping related information from at least one of an access side network or a core network.

10. The method of claim 9, wherein the mapping related information is between a general packet radio service tunneling protocol (GTP) tunnel information of an F1 interface and the target node identifier.

11. The method of claim 10, wherein the GTP tunnel information of the F1 interface includes an address.

12. The device of claim 8, wherein the adaptor layer header is added by the first IAB node to include the target node identifier and the routing path information.

13. The device of claim 8, wherein the adaptor layer header is added by an adaptor layer located above a radio link control (RLC) layer.

14. The device of claim 8, wherein the first network element of the IAB donor is an IAB donor distributed unit (DU) and the second network element of the IAB donor is an IAB donor centralized unit (CU).

* * * * *